US012762393B2

(12) United States Patent
Sidahmed et al.

(10) Patent No.: US 12,762,393 B2
(45) Date of Patent: Oct. 13, 2026

(54) FEDERATED LEARNING WITH PARTIALLY TRAINABLE NETWORKS

(71) Applicant: Google LLC, Mountain View, CA (US)

(72) Inventors: Hakim Sidahmed, Washington, DC (US); Zheng Xu, San Jose, CA (US); Mingqing Chen, Santa Clara, CA (US); Yuan Cao, Mountain View, CA (US); Ankush Garg, Santa Clara, CA (US)

(73) Assignee: GOOGLE LLC, Mountain View, CA (US)

(*) Notice: Subject to any disclaimer, the term of this patent is extended or adjusted under 35 U.S.C. 154(b) by 1233 days.

(21) Appl. No.: 17/568,933

(22) Filed: Jan. 5, 2022

(65) Prior Publication Data

US 2023/0214642 A1 Jul. 6, 2023

(51) Int. Cl.
*G06N 3/08* (2023.01)

(52) U.S. Cl.
CPC .................................... *G06N 3/08* (2013.01)

(58) Field of Classification Search
None
See application file for complete search history.

(56) References Cited

U.S. PATENT DOCUMENTS 11,900,246 B2 * 2/2024 Lee ........................ G06V 10/82
2025/0037861 A1 * 1/2025 Yao ........................ G16H 10/40

OTHER PUBLICATIONS

Enthoven, David, and Zaid Al-Ars. "Fidel: Reconstructing Private Training Samples from Weight Updates in Federated Learning." 2022 9th International Conference on Internet of Things: Systems, Management and Security (IOTSMS), IEEE, 2022. Crossref, https://doi.org/10.1109/iotsms58070.2022.10062088. (Year: 2022).*
Sidahmed, H., Xu, Z., Garg, A., Cao, Y., & Chen, M. (2021). Efficient and Private Federated Learning with Partially Trainable Networks. arXiv [Cs.LG]. Retrieved from http://arxiv.org/abs/2110.03450 (Year: 2021).*
Wimmer, P., Mehnert, J., & Condurache, A. (2021). FreezeNet: Full Performance by Reduced Storage Costs. In Computer Vision—ACCV 2020 (pp. 685-701). doi:10.1007/978-3-030-69544-6_41 (Year: 2021).*

(Continued)

*Primary Examiner* — Omar F Fernandez Rivas
*Assistant Examiner* — Corey M Sackalosky
(74) *Attorney, Agent, or Firm* — DORITY & MANNING, P.A.

(57) ABSTRACT

Example aspects of the present disclosure provide a novel, resource-efficient approach for federated machine learning techniques with PTNs. The system can determine a first set of training parameters from a plurality of parameters of the global model. Additionally, the system can generate a random seed, using a random number generator, based on a set of frozen parameters. Moreover, the system can transmit, respectively to a plurality of client computing devices, a first set of training parameters and the random seed. Furthermore, the system can receive, respectively from the plurality of client computing devices, updates to one or more parameters in the first set of training parameters. Subsequently, the system can aggregate the updates to one or more parameters that are respectively received from the plurality of client computing devices. The system can modify one or more global parameters of the global model based on the aggregation.

20 Claims, 9 Drawing Sheets

(56) References Cited

OTHER PUBLICATIONS

Enthoven, D., & Al-Ars, Z. (2021). Fidel: Reconstructing Private Training Samples from Weight Updates in Federated Learning. arXiv [Cs.LG]. Retrieved from http://arxiv.org/abs/2101.00159 (Year: 2021).*
J. Yang, Y. Zheng, J. Li and F. Shen, "Federated Deep Learning Algorithm For Target Recognition Based On Trusted Network," 2021 7th International Conference on Big Data and Information Analytics (BigDIA), Chongqing, China, 2021, pp. 478-484, doi: 10.1109/BigDIA53151.2021.9619633. (Year: 2021).*
Allen-Zhu et al., "Learning and Generalization in Overparameterized Neural Networks, Going Beyond Two Layers", Advances in neural information processing systems, 2019, 12 pages.
Anthony et al., "Neural Network Learning: Theoretical Foundations", Cambridge University Press, USA, 2009, 404 pages.
Ba et al., "Do Deep Nets Really Need to be Deep?", arXiv:1312.6184v7, Oct. 11, 2017, 10 pages.
Bonawitz et al., "Towards Federated Learning at Scale: System Design", arXiv:1902.01046v2, Mar. 22, 2019, 15 pages.
Caldas et al., "LEAF: A Benchmark for Federated Settings", arXiv:1812.01097v3, Dec. 9, 2019, 9 pages.
Caldas et al., "Expanding the Reach of Federated Learning by Reducing Client Resource Requirements", arXiv:1812.07210v2, Jan. 8, 2019, 12 pages.
Child et al., "Generating Long Sequences with Sparse Transformers", arXiv:1904.10509v1, Apr. 23, 2019, 10 pages.
Choromanski et al., "Rethinking Attention with Performers", arXiv:2009.14794v3, Mar. 9, 2021, 38 pages.
Cohen et al., "EMNIST: an Extension of MNIST to Handwritten Letters", arXiv:1702.05373v2, Mar. 1, 2017, 10 pages.
Du et al., "Gradient Descent Provably Optimizes Over-Parameterized Neural Networks", arXiv:1810.02054v2, Feb. 5, 2019, 19 pages.
Fournier et al., "A Practical Survey on Faster and Lighter Transformers", arXiv:2103.14636v1, Mar. 26, 2021, 21 pages.
Frankle et al., "The Lottery Ticket Hypothesis: Finding Sparse, Trainable Neural Networks", arXiv:1803.03635v5, Mar. 4, 2019, 42 pages.
Frankle et al., "Training BatchNorm and Only BatchNorm: On the Expressive Power of Random Features in CNNs", arXiv:2003.00152v3, Mar. 21, 2021, 28 pages.
Garg et al., "Echo State Neural Machine Translation", arXiv:2002.11847v, Feb. 27, 2020, 6 pages.
Giryes et al., "Deep Neural Networks with Random Gaussian Weights: A Universal Classification Strategy?", arXiv:1504.08291v5, Mar. 14, 2016, 14 pages.
Granqvist et al., "Improving on-device Speaker Verification Using Federated Learning with Privacy, 2020", arXiv:2008.02651v1, Aug. 6, 2020, 5 pages.
He et al., "Deep Residual Learning for Image Recognition", arXiv:1512.03385v1, Dec. 10, 2015, 12 pages.
Hinton et al., "Distilling the Knowledge in a Neural Network", arXiv:1503.02531v1, Mar. 9, 2015, 9 pages.
Horvath et al., "FjORD: Fair and Accurate Federated Learning Under Heterogeneous Targets with Ordered Dropout", arXiv:2102.13451v5, Jan. 11, 2022, 19 pages.
Hsieh et al., "The Non-IID Data Quagmire of Decentralized Machine Learning", arXiv:1910.00189v2, Aug. 19, 2020, 24 pages.
Hsu et al., "Measuring the Effects of Non-Identical Data Distribution for Federated Visual Classification", arXiv:1909.06335v1, Sep. 13, 2019, 5 pages.
Huang et al., "Trends in Extreme Learning Machines: A Review.", Neural Networks, vol. 61, 2015, pp. 32-48.
Ingerman et al., "Introducing TensorFlow Federated", https://medium.com/tensorflow/introducing-tensorflow-federated-a4147aa20041, retrieved on May 13, 2022, 6 pages.
Jaeger, "Adaptive Nonlinear System Identification with Echo State Networks", Advances in Neural Information Processing Systems, vol. 15, pp. 609-616, 2002, 8 pages.
Kairouz et al., "Advances and Open Problems in Federated Learning", arXiv:1912.04977v3, Mar. 9, 2021, 121 pages.
Kairouz et al., "Fast Dimension Independent Private AdaGrad on Publicly Estimated Subspaces", arXiv:2008.06570v2, Jan. 30, 2021, 25 pages.
Kairouz et al., "Practical and Private (Deep) Learning without Sampling or Shuffling", arXiv:2103.00039v3, Dec. 10, 2021, 37 pages.
Konecny et al., "Federated Learning: Strategies for Improving Communication Efficiency", arXiv:1610.05492v2, Oct. 30, 2017, 10 pages.
Krizhevsky et al., "Learning Multiple Layers of Features from Tiny Images", 2009, 60 pages.
LeCun et al., "Optimal Brain Damage", Advances in Neural Information Processing Systems, 1990, pp. 598-605.
Lee-Thorp et al., "FNet: Mixing Tokens with Fourier Transforms", arXiv:2105.03824v3, Sep. 10, 2021, 18 pages.
Li et al., "Federated Learning: Challenges, Methods, and Future Directions", arXiv:1908.07873v1, Aug. 21, 2019, 21 pages.
Maass et al., "Real-Time Computing Without Stable States: A New Framework for Neural Computation Based on Perturbations", Neural Computation, vol. 14, No. 11, 2002, pp. 2531-2560.
McMahan et al., "Communication-Efficient Learning of Deep Networks from Decentralized Data", arXiv:1602.05629v3, Feb. 28, 2017, 11 pages.
McMahan et al., "Learning Differentially Private Recurrent Language Models", arXiv:1710.06963v3, Feb. 24, 2018, 14 pages.
Neyshabur et al., "Towards Understanding the Role of Over-Parametrization in Generalization of Neural Networks", arXiv:1805.12076v1, May 30, 2018, 19 pages.
Ramaswamy et al., "Training Production Language Models without Memorizing User Data", arXiv:2009.10031v1, Sep. 21, 2020, 11 pages.
Reddi et al., "Adaptive Federated Optimization", arXiv:2003.00295v5, Sep. 8, 2021, 38 pages.
Rosenfeld et al., "Intriguing Properties of Randomly Weighted Networks: Generalizing While Learning Next to Nothing", arXiv:1802.00844v1, Feb. 2, 2018, 12 pages.
Sankararaman et al., "The Impact of Neural Network Overparameterization on Gradient Confusion and Stochastic Gradient Descent", arXiv:1904.06963v5, Jul. 6, 2020, 28 pages.
Sheller et al., "Federated Learning in Medicine: Facilitating Multi-institutional Collaborations without Sharing Patient Data", Scientific Reports, vol. 10, 2020, 12 pages.
Shen et al., "Reservoir Transformers", arXiv:2012.15045v2, Jun. 1, 2021, 16 pages.
Shrivastava et al., "Echo State Speech Recognition", arXiv:2102.09114v1, Feb. 18, 2021, 5 pages.
Sidahmed et al., "Efficient and Private Federated Learning with Partially Trainable Networks", arXiv:2110.03450v2, Nov. 8, 2021, 13 pages.
Singhal et al., "Federated Reconstruction: Partially Local Federated Learning", arXiv:2102.03448v6, Apr. 27, 2022, 20 pages.
Tramer et al., "Differentially Private Learning Needs Better Features (or Much More Data)", arXiv:2011.11660v3, Feb. 18, 2021, 25 pages.
Vaswani et al., "Attention Is All You Need", arXiv:1706.03762v5, Dec. 6, 2017, 15 pages.
Wang et al., "Pufferfish: Communication-efficient Models at No Extra Cost", arXiv:2103.03936v1, Mar. 5, 2021, 22 pages.
Wang et al., "A Field Guide to Federated Optimization", arXiv:2107.06917v1, Jul. 14, 2021, 88 pages.
Wang et al., "Linformer: Self-Attention with Linear Complexity", arXiv:2006.04768v3, Jun. 14, 2020, 12 pages.
Wieting et al., "No Training Required: Exploring Random Encoders for Sentence Classification", arXiv:1901.10444v1, Jan. 29, 2019, 16 pages.
Yang et al., "Federated Machine Learning: Concept and Applications", arXiv:1902.04885v1, Feb. 13, 2019, 19 pages.

(56) References Cited

OTHER PUBLICATIONS

Zhang et al., "Are All Layers Created Equal?", arXiv:1902.01996v4, Mar. 8, 2022, 28 pages.
Zhou et al., "Bypassing the Ambient Dimension: Private SGD with Gradient Subspace Identification", arXiv:2007.03813v2, Apr. 23, 2021, 35 pages.

* cited by examiner

FEDERATED LEARNING WITH PARTIALLY TRAINABLE NETWORKS

FIELD

The present disclosure relates generally to systems and methods for training machine-learned models in a federated learning setting. More particularly, the present disclosure relates to systems and methods for efficient and private federated learning of machine-learned models with partially trainable networks.

BACKGROUND

The federated learning framework enables learning of a machine-learned model or across multiple decentralized devices (e.g., user devices such as smartphones) which each hold respective local data samples, typically without requiring exchange of the data samples between devices or to a central authority. This approach stands in contrast to traditional centralized machine learning techniques where all data samples are uploaded to a centralized authority, as well as to more classical decentralized approaches which assume that local data samples are identically distributed.

Federated learning has been widely studied in distributed training of neural networks due to its appealing characteristics such as leveraging the computational power of edge devices, removing the necessity of sending user data to server, and various improvements on trust, security, privacy, and fairness. However, many challenges still exist in conventional federated learning systems because mobile devices often have limited communication bandwidth and local computation resources. Therefore, improving the efficiency of federated learning systems is needed for improved scalability and usability.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for federated learning of a global model. The method can include determining, by a server computing device, a first set of training parameters from a plurality of parameters of the global model, wherein the plurality of parameters of the global model includes the first set of training parameters and a set of frozen parameters. Additionally, the method can include generating an initialization value based on the set of frozen parameters. Moreover, the method can include transmitting, respectively, to a plurality of client computing devices, the first set of training parameters and the initialization value, wherein the set of frozen parameters are reconstructed from the initialization value by the plurality of client computing devices using the random number generator. Furthermore, the method can include receiving, respectively from the plurality of client computing devices, updates to one or more parameters in the first set of training parameters, wherein the updates to one or more parameters were generated respectively by the plurality of computing devices using a local model stored respectively in the plurality of client computing devices. Subsequently, the method can include aggregating the updates to one or more parameters that are respectively received from the plurality of client computing devices. The method can also include modifying one or more global parameters of the global model based on the aggregation of the updates to the one or more parameters that are respectively received from the plurality of client computing devices.

Another example aspect of the present disclosure is directed to a server computing device having one or more processors and one or more non-transitory computer-readable media. The media can collectively store a machine learning model having a plurality of global parameters, and instructions that, when executed by the one or more processors, can cause the server computing device to perform operations. The server operations can include determining, by a server computing device, a first set of training parameters from a plurality of parameters of the global model, wherein the plurality of parameters of the global model includes the first set of training parameters and a set of frozen parameters. Additionally, the server operations can include transmitting, respectively to a plurality of client computing devices, the first set of training parameters and the initialization value, wherein the set of frozen parameters are reconstructed from the initialization value by the plurality of client computing devices. Furthermore, the server operations can include receiving, respectively from the plurality of client computing devices, updates to one or more parameters in the first set of training parameters, wherein the updates to one or more parameters were generated respectively by the plurality of computing devices using a local model stored respectively in the plurality of client computing devices. Subsequently, the server operations can include aggregating the updates to one or more parameters that are respectively received from the plurality of client computing devices. Then, the server operations can include modifying one or more global parameters of the machine learning model based on the aggregation of the updates to the one or more parameters that are respectively received from the plurality of client computing devices.

Another example aspect of the present disclosure is directed to one or more non-transitory computer-readable media that collectively store a machine learning model having been updated by performance of operations. The operations can include determining a first set of training parameters from a plurality of parameters of the global model, wherein the plurality of parameters of the global model includes the first set of training parameters and a set of frozen parameters. Additionally, the operations can include transmitting, respectively to a plurality of client computing devices, the first set of training parameters and the initialization value, wherein the set of frozen parameters are reconstructed from the initialization value by the plurality of client computing devices. Furthermore, the operations can include receiving, respectively from the plurality of client computing devices, updates to one or more parameters in the first set of training parameters, wherein the updates to one or more parameters were generated respectively by the plurality of computing devices using a local model stored respectively in the plurality of client computing devices. Subsequently, the operations can include aggregating the updates to one or more parameters that are respectively received from the plurality of client computing devices. Then, the operations can include modifying one or more global parameters of the machine learning model based on the aggregation of the updates to the one or more parameters that are respectively received from the plurality of client computing devices.

In some instance, the method can further include calculating a performance value of the global model based on the modification of the one or more global parameters of the global model. Additionally, the method can include determining whether the performance value exceeds a threshold value.

In some instances, when the performance value does exceed the threshold value, the method can further include: determining a second set of training parameters from the set of frozen parameters; transmitting, respectively to the plurality of client computing devices, the first set of training parameters and the second set of training parameters; receiving, respectively from the plurality of client computing devices, new updates to one or more parameters in the first set of training parameters and second set of training parameters; aggregating the new updates to one or more parameters that are respectively received from the plurality of client computing devices; and modifying one or more global parameters of the global model based on the aggregation of the new updates to the one or more parameters that are respectively received from the plurality of client computing devices.

In some instances, when the performance value does not exceeds the threshold value, the method can further include: determining a new set of training parameters from the plurality of parameters of the global model, wherein the new set of training parameters having less parameters than the first set of training parameters; transmitting, respectively to the plurality of client computing devices, the new set of training parameters and a new initialization value (e.g., new random seed); receiving, respectively from the plurality of client computing devices, new updates to one or more parameters in the new set of training parameters; aggregating the new updates to one or more parameters that are respectively received from the plurality of client computing devices; and modifying one or more global parameters of the global model based on the aggregation of the new updates to the one or more parameters that are respectively received from the plurality of client computing devices.

In some instances, the performance value can exceed the threshold value when an accuracy percentage of the global model is reduced by a specific margin after the modification of the one or more global parameters of the global model.

In some instances, the performance value can be associated with a confusion matrix that is related to a number of true positives, true negatives, false positives, or false negatives.

In some instances, the performance value can be associated with a precision ratio that is related to a number of true positives and a total positive predictions.

In some instances, the updates to one or more parameters in the first set of training parameters can be calculated by processing the local model with the first set of parameters and the set of frozen parameters.

In some instances, the updates to one or more parameters in the first set of training parameters can be respectively based on data stored locally on the plurality of client computing devices.

In some instances, the first set of parameters and the set of frozen parameters can be determined based on a specific network architecture associated with the global model.

In some instances, the set of frozen parameters can be associated with a convolutional layer, an encoder layer, or a dense layer of the global model.

In some instances, the first set of parameters can be associated with a normalization layer of the global model.

In some instances, the set of frozen parameters can be respectively set to initial values, wherein the initial values are generated from Gaussian initializers.

In some instances, the aggregating the updates to one or more parameters that are respectively received from the plurality of client computing devices can be performed by the server computing device by using a federated averaging technique.

In some instances, the set of frozen parameters can be different during each training iteration in a plurality of training iterations for the global model.

In some instances, the first set of training parameters can be transmitted to a first client computing device in the plurality of client computing device, a second set of training parameters can be sent to a second client computing device based on a low resource capacity of the second client computing device. The first set of training parameters can have more training parameters than the second set of training parameters.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
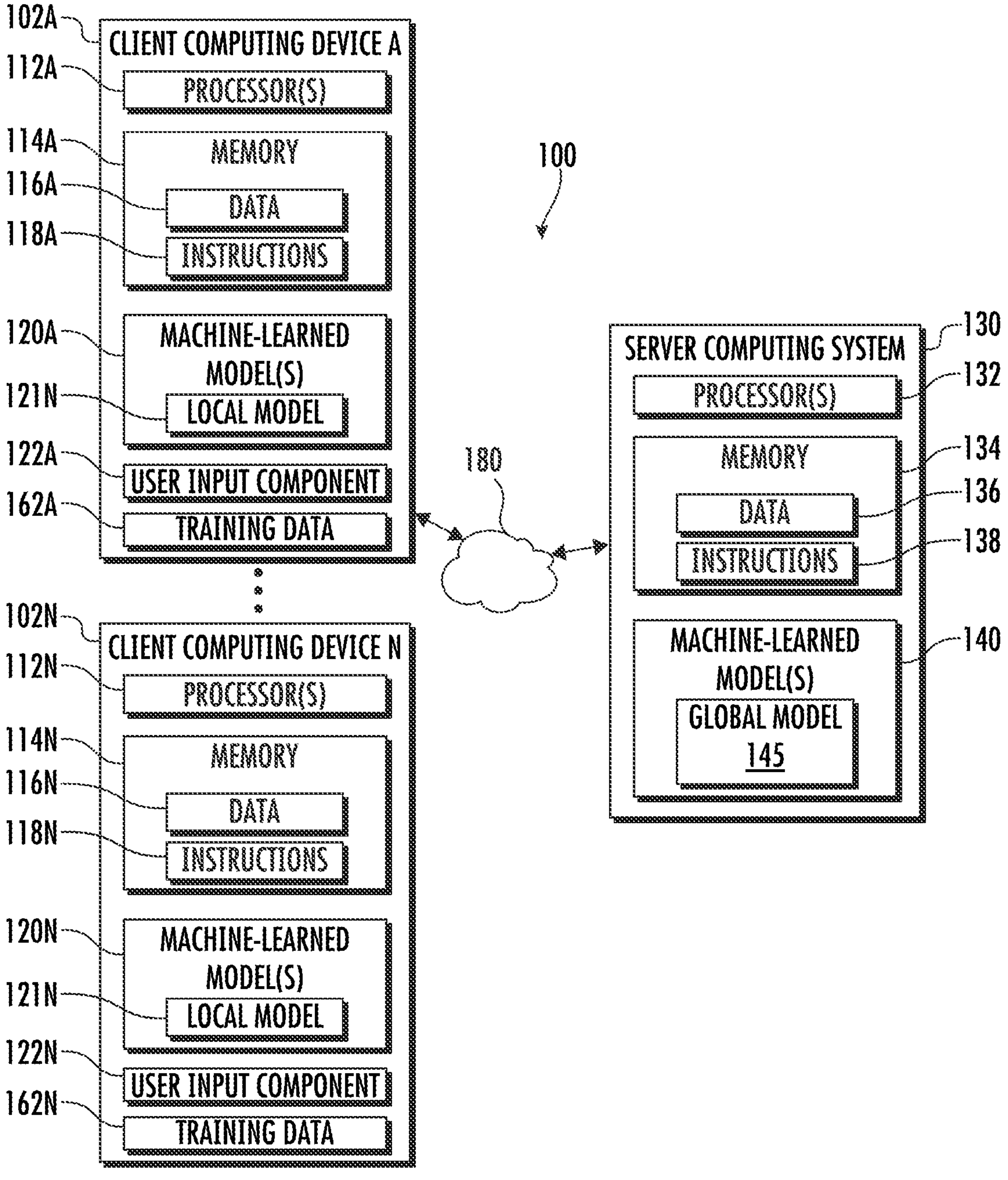
FIG. 1A depicts a block diagram of an example computing system that performs federated learning with partially trainable networks (PTNs) according to example embodiments of the present disclosure.

Reference numerals that are repeated across plural figures are intended to identify the same features in various implementations.

DETAILED DESCRIPTION

Overview

Federated learning is used for decentralized training of machine learning models on a large number (e.g., millions) of edge mobile devices. Federated learning can be challenging because mobile devices often have limited communication bandwidth and local computation resources. Techniques described herein can improve the efficiency of federated learning, which is critical for scalability and usability. The techniques include leveraging partially trainable neural networks, by freezing a portion of the model parameters during the entire training process, to reduce the communication cost with little implications on model performance. Through extensive experiments, the federated learning system, using the techniques described herein, can result in greatly improved communication efficiency (e.g., more than 40 times reduction in communication cost) while maintaining accuracy. The techniques also enable faster training, with a smaller memory footprint, and better utility for strong differential privacy guarantees. Additionally, the techniques greatly improve performance when overparameterization has occurred in on-device learning.

A large trove of data is being generated with the proliferation of edge devices, such as mobile phones, medical sensors, and smart home devices. While this data can be used to develop intelligent algorithms, they may contain private information that require privacy safeguards in order to prevent sharing of the data with others. In recent years, federated learning has been introduced as an alternative to centralized learning to protect user privacy when training a machine learning model. In federated learning, participating clients collaboratively learn a shared model under the supervision of a central server, where: each communication round can start with the central server broadcasting the global model to the participating client devices; the client devices then performing computations using local data stored locally on each of the client device, and the client devices sending their aggregated updates back to the server to update the global model. While federated learning can be performed on a relatively small number of clients, many applications involve a large number of edge devices, such as mobile phones, or sensors. This setting can be referred to as cross-device federated learning. Training large models on edge devices is challenging due to unreliable connections and limited computational capabilities.

According to some embodiments, the federated learning system can be based on federated averaging, which can resolve many of the restricting constraints of cross-device federated learning. Federated averaging is an algorithm in federated learning. Federated averaging can be a two-stage optimization framework where: a client optimizer updates local models from the local data stored on the client, and a server optimizer updates the global model from the aggregated client updates. Additionally, instead of averaging client local models to replace the global model, the client updates (e.g., the difference between the initial model received from server, and the client local model after training on private data) are aggregated, and then used as pseudo-gradients to update the global model.

Additionally, the federated learning system can combine federated learning with differential privacy to provide stronger privacy to the client devices and the clients. For example, differential privacy can prevent memorization, and protect against potential leakage of user data when a model is released publicly.

Moreover, the federated learning system can use deep neural networks to improve performance on various machine learning tasks. The federated learning system can improve the performance of deep neural networks by increasing the model size in an overparameterized network. Even though parameters of the overparameterized networks can be redundant and pruned, by increasing the size of the model it can regularize the optimization landscape to facilitate training. Furthermore, by training a small fraction of the parameters of a large model, such as batch normalization layers in convolutional networks, the federated learning system can achieve comparable performance as training all the parameters. As a result, the federated learning system can optimize the learning phase by freezing part of the parameters of a large model in federated learning.

In some instances, the federated learning system can use partially trainable networks (PTNs) to reduce the communication and computation burdens of training large models. PTNs can make federated learning more accessible to various applications. By using the federated averaging algorithm, the federated learning system can communicate the trainable parameters, and an initialization value (e.g., random seed) from server to client devices. The trainable parameters can include a subset of all the parameters in the model. For example, the trainable parameters can represent as a percentage (e.g., two percent, five percent) of the total network parameter count. The client devices can reconstruct the full model by regenerating the frozen parameters from the initialization value (e.g., random seed), perform local training on private data, and send back the updates on the trainable parameters to the server. As a result, on only sending the trainable parameters, the communication between the server and the client devices can be significantly reduced by the size of frozen parameters. Additionally, client devices can also save local computations, and memory on gradient calculations for the frozen parameters. For example, the federated learning of partially trainable neural network algorithms can be used to train various network architectures, including, but not limited to, convolutional networks for computer vision, and transformers for language tasks.

Empirical evidence by running experiments on benchmark datasets highlights technical improvements by tremendously reducing the communication cost (e.g., communication cost reduction by 40 factors with some datasets), while maintaining minimal or negligible reduction in accuracy. Additionally, in some settings, the simulation training times can be reduced greatly (e.g., by 25% with some datasets) and the memory footprint can be reduced (e.g., by 10% with some datasets). Moreover, the federated learning model with a partially trainable network (e.g., parameters) can even achieve better utility gains (e.g., improved accuracy) than training the full model when the models have settings for privacy protection. The utility gains for the federated learning model with a partially trainable network (PTN) can be even greater in comparison to training the full model when the privacy protection is strong (small c).

Examples of embodiments and implementations of the systems and methods of the present disclosure are discussed in the following sections.

Example of Federated Learning with PTNs

Example aspects of the present disclosure for federated learning with PTNs. The next section proposes example algorithms to train a model by using PTNs.

Example Algorithms

According to some embodiments, the federated learning system can use PTNs in federated learning tasks using the example Algorithm 1. For example, the federated learning system can freeze a set of parameters after initialization. This allows the system to encapsulate (e.g., summarize) the frozen parameters into an initialization value. For example, the initialization value can be a single random seed, provided that the server and clients share the same random number generator. The single random seed can be sent to the client devices (e.g., edge devices). The client devices can reconstruct the frozen parameters by using the single random seed. Additionally, the client devices may not need to send back updates for the frozen parameters to the server. Algorithm 1 summarized an example of the technique. Algorithm 1 includes a federated averaging algorithm with two stage optimization by ServerOpt and ClientOpt. In cross-device federated learning, only a small subset of the clients $S^{(t)}$ (compared to the large population) can be accessed at each communication round t. The system can use the number of the local samples on client i as weight $p_i$ to aggregate the local updates.

Example Algorithm 1: Federated Learning of Partially Trainable Neural Networks Algorithm 1 is an example algorithm for performing federated learning of partially trainable neural networks, according to example embodiments of the present disclosure 1) Input. Initial model $x^{(0)}$; ClientOpt , ServerOpt with learning rates $\eta$, $\alpha$
2) Split $x^{(0)}$ into trainable part $y^{(0)}$, and non-trainable part generated by random seed z
3) for $t \in \{0,1, \ldots , T-1\}$ do
    a. Send $(y^{(t)}, z)$ to a subset $S^{(t)}$ of clients
    b. for client $i \in S^{(t)}$ in parallel do
        i. Initialize local model $x_i^{(t,0)} = \text{Reconstruct}(y^{(t)}, z)$
        ii. for $k = 0, \ldots , \tau_i - 1$ do
            1. Compute local stochastic gradient $g_i(y_i^{(t,k)})$ by backprop through $x_i^{(t,k)}$
            2. Perform local update $y_i^{(t,k+1)} = \text{ClientOpt}(y_i^{(t,k)}, g_i(y_i^{(t,k)}), \eta, t)$
        iii. end for
        iv. Compute and send back local model changes $\Delta_i^{(t)} = y_i^{(t,\tau_i)} - y_i^{(t,0)}$
    c. end for
    d. Aggregate local changes $\Delta^{(t)} = \Sigma_{i \in S^{(t)}} \; p_i \Delta_i^{(t)} / \Sigma_{i \in S^{(t)}} \; p_i$
    e. Update global model $y^{(t+1)} = \text{ServerOpt}(y^{(t)}, -\Delta^{(t)}, \alpha, t)$
4) end for In some instances, the design of the PTNs can depend on the network architecture. By freezing a large number of parameters can improve communication efficiency substantially, the system can determine to freeze layers that contain a large proportion of the parameters. Additionally, the system can select different layers for different architectures. To maximize the communication and computation efficiencies of the PTNs, the system can perform the following operations.

According to some embodiments, the process can include: (i) freezing the largest parameter block of a network. Additionally, the process can include: (ii) adding more blocks to be frozen, if it does not degrade the model performance on utility (e.g., accuracy). Moreover, if the model performance is degraded above a threshold, then the process can include: (iii) switching to a smaller block if it did degrade the model performance by a large margin. Furthermore, the process can repeat (i), (ii), and (iii) to find the optimal partially trainable network (PTN). Once an optimal PTN is found for a specific network architecture, the same PTN can be used for various application tasks that use the same network architecture.

For illustrative purposes only, the system can freeze different layers on several network architectures, such as a residual neural network (ResNet) with group normalization for image tasks, a small convolutional neural network as feature extractors with a few fully connected layers for classification, and a transformer neural network for language tasks. For example, the convolutional layers can be frozen in the ResNet architecture, the dense layer following the convolutional layers in the convolutional neural network architecture, and the encoder dense layers in the transformer neural network architecture.

According to some embodiments, given that the normalization layers usually have a small number of parameters, the system can always train the normalization layers. Additionally, when the normalization layers are frozen, it can degrade the performance of the model. Moreover, the parameters that are frozen can be set to their initial values by using an initializer. For example, the initial values of the frozen parameters can be generated from Gaussian initializers.

In some instances, the system can change the set of frozen variables at every round. Additionally, the system can adapt the number of trainable parameters (e.g., variables) and/or the number of frozen variables depending on the edge device capacity. For example, the server computing device can send a first number of trainable parameters to a low resource device and a second number of trainable parameters to a high resource device. The first number being less than the second number. As a result, the low resource device would train very fewer parameters, and a higher resource device would train more parameters at a given iteration (e.g., round).

Advantages of the Federated Learning of Partially Trainable Neural Networks

The techniques described herein, which are used by the federated learning system, can improve communication (e.g., network) efficiencies. Communication can be one of the main bottlenecks in cross-device federated learning. Model transmission from server to devices can be a major constraint for the server, particularly when some client devices have limited network connection. Additionally, the client devices sending the model updates back to the server can be even more challenging, as uplink is typically much slower than downlink. The federated learning system can mitigate communication issues because the frozen parameters are compressed into an initialization value (e.g., a random seed) that is sent from server to client devices. Additionally, the participating client devices only send updates for the trainable parameters and may not need to send updates back for the frozen parameters.

With regards to differential privacy, federated learning can be designed for privacy protection, as the clients do not share their private data. By combining federated learning and differential privacy, the system can provide stronger privacy defenses. For example, federated averaging can assist in achieving user-level differential privacy in federated learning.

With regards to training time, the system can reduce the client training time which allows more devices to complete their local computations in the allotted time in a round. Reducing training time can be desirable in practical federated learning. In addition, reducing the training time allows the system to train larger models in production settings where the federated learning tasks have a limited amount of time to run on edge devices. The system can reduce the training time because it may not need to calculate gradients for the frozen parameters. The system can increase the reduction in the client training time as the number of frozen parameters increases. Additionally, the system can provide a significant decrease in runtime for deep convolutional models, for example, by freezing the convolutional layers.

With regards to memory footprint, the system can also improve the memory footprint of model training in federated learning, because the system may not need to save intermediate activations of frozen layers after backpropagation. Additionally, the system may not need to calculate or save the gradients for the frozen layers. Furthermore, when computing the model updates on clients, two copies of the trainable parameters (e.g., new value and previous value) can be needed to generate the client model update $\Delta_i$, but the system may not need both copies of the frozen parameters. For example, by freezing the convolutional layers drastically reduces the memory usage at the client devices. A layer can be the highest-level building block in deep learning. A layer can be a container that usually receives weighted input, transforms it with a set of mostly non-linear functions and then passes these values as output to the next layer. A layer can usually be uniform, that is it only contains one type of activation function, pooling, convolution etc. so that it can be easily compared to other parts of the network. The first and last layers in a network are called input and output layers, respectively, and all layers in between are called hidden layers.

Example Devices and Systems

With reference now to the Figures, example embodiments of the present disclosure will be discussed in further detail.

FIG. 1A depicts a block diagram of an example computing system 100 that performs federated learning with a PTN according to example embodiments of the present disclosure. The system 100 includes a plurality of client computing devices (e.g., client computing device A 102A, client computing device B (not pictured) . . . , client computing device N 102N), a server computing system 130, and a training computing system 150 that are communicatively coupled over a network 180.

The client computing devices 102A, 102N can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing devices 102A, 102N include one or more processors 112A, 112N and a memory 114A, 114N. The one or more processors 112A, 112N can be any suitable processing device (e.g., a processor core, a microprocessor, an ASIC, an FPGA, a controller, a microcontroller, etc.) and can be one processor or a plurality of processors that are operatively connected. The memory 114A, 114N can include one or more non-transitory computer-readable storage media, such as RAM, ROM, EEPROM, EPROM, flash memory devices, magnetic disks, etc., and combinations thereof. The memory 114A, 114N can store data 116A, 116N and instructions 118A, 118N which are executed by the processors 112A, 112N to cause the client computing devices 102A, 102N to perform operations.

In some implementations, the client computing devices 102A, 102N can store or include one or more machine-learned models 120A, 120N. The one or more machine-learned models 120A, 120N can be local machined-learned models 121A, 121N that are stored locally on the client computing devices 102A, 102N and are processing some data that is stored locally on the client computing devices 102A, 102N. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120A, 120N can be received from the server computing system 130 over network 180, stored in the client computing device memory 114A, 114N, and then used or otherwise implemented by the one or more processors 112A, 112N. In some implementations, the client computing devices 102A, 102N can implement multiple parallel instances of a single machine-learned model 120A, 120N (e.g., to perform parallel classification across multiple instances of models).

Additionally, or alternatively, one or more machine-learned models 140 can be included in or otherwise stored and implemented by the server computing system 130 that communicates with the client computing device 102 according to a client-server relationship. In some instances, the one or more machine-learned models 140 can include a global model 145 having a plurality of parameters. For example, the machine-learned models 140 can be implemented by the server computing system 130 as a portion of a web service (e.g., an image classification service). Thus, one or more models 120 can be stored and implemented at the client computing device 102 and/or one or more models 140 can be stored and implemented at the server computing system 130.

The client computing devices 102A, 102N can also include one or more user input components 122A, 122N that receives user input. The user input component 122A can receive user input from a first user, and the user component 122N can receive user input from another user. For example, the user input component 122A, 122N can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

In some instances, the computing devices/systems 102A, 102N, 130 can train the machine-learned models 120A, 120N and/or 140 stored at the client computing devices 102A, 102N and/or 140 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The computing devices/systems 102, 130 can perform a number of generalization techniques (e.g., weight decays, dropouts, etc.) to improve the generalization capability of the models being trained.

In particular, the client computing device 102A, 102N can include training data 162A, 162N such as a local training dataset including a plurality of training examples. The training examples can be used in the federated learning with partially trainable parameters approach described herein to train the models 120A, 120N, 140.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a re-clustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the client computing devices 102A, 102N can include the training dataset 162A, 162N. In such implementations, the models 120A, 120N can be both trained and used locally at the client computing device 102A, 102N. In some of such implementations, the client computing device 102A, 102N can personalize the models 120A, 120N based on user-specific data that is stored locally.

Figure 1B:
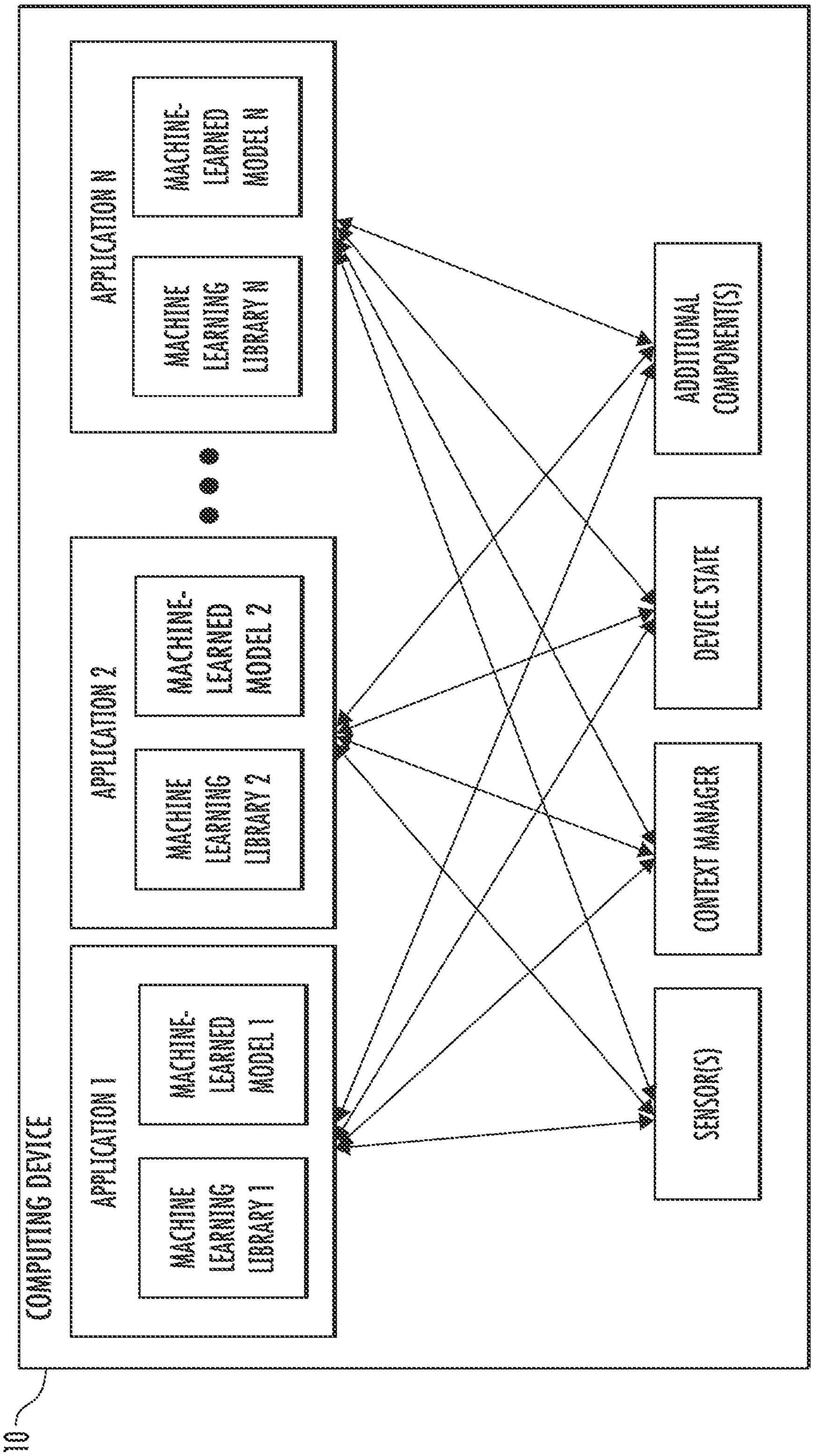
FIG. 1B depicts a block diagram of an example computing device that performs federated learning with PTNs according to example embodiments of the present disclosure.

FIG. 1B depicts a block diagram of an example computing device 10 that performs according to example embodiments of the present disclosure. The computing device 10 can be a client computing device 102A, 102N or a server computing device 130 in FIG. 1A.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
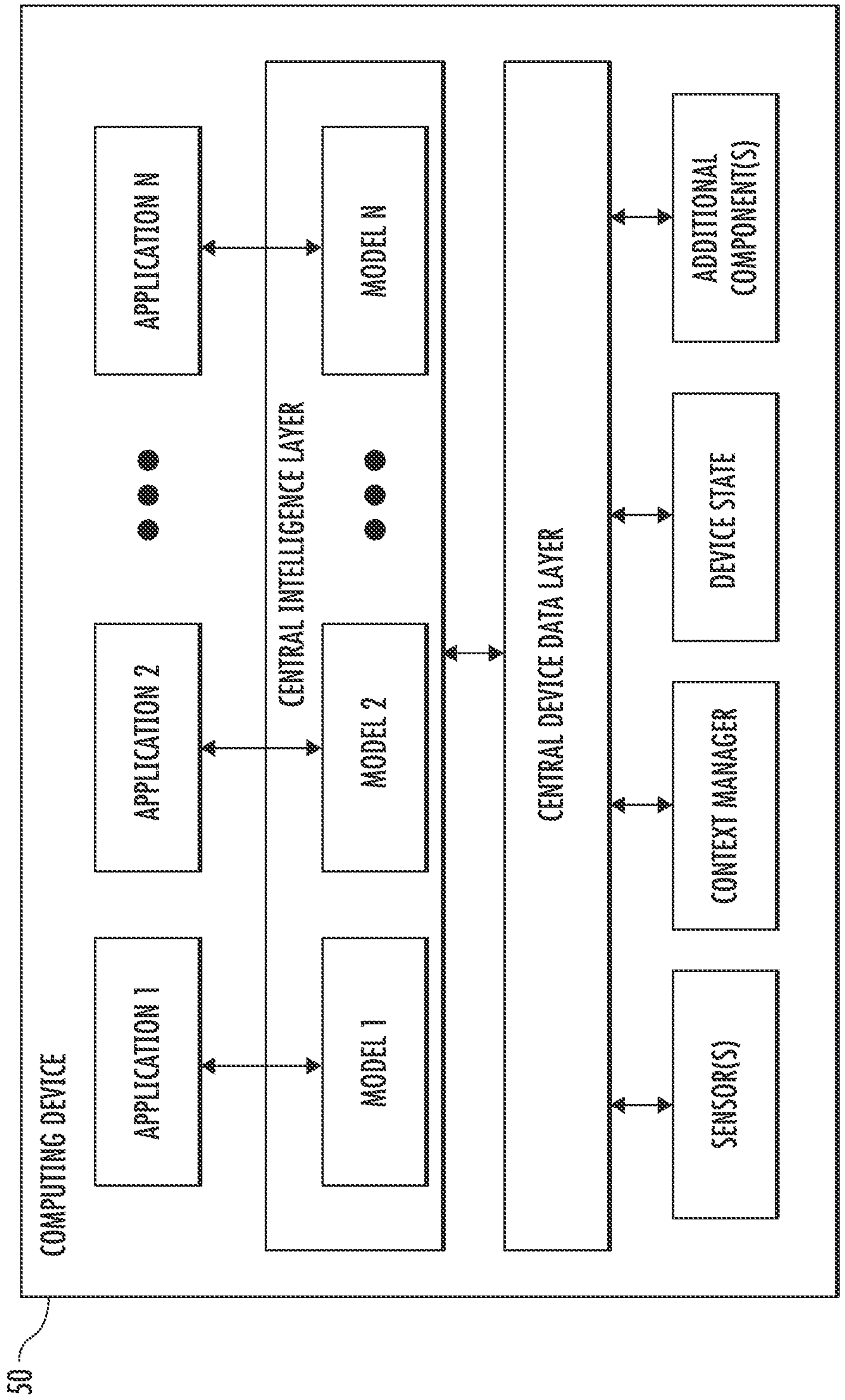
FIG. 1C depicts a block diagram of an example computing device that performs federated learning with PTNs according to example embodiments of the present disclosure.

FIG. 1C depicts a block diagram of an example computing device 50 that performs according to example embodiments of the present disclosure. The computing device 50 can be a client computing devices 102A, 102N or a server computing device 130 in FIG. 1A.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
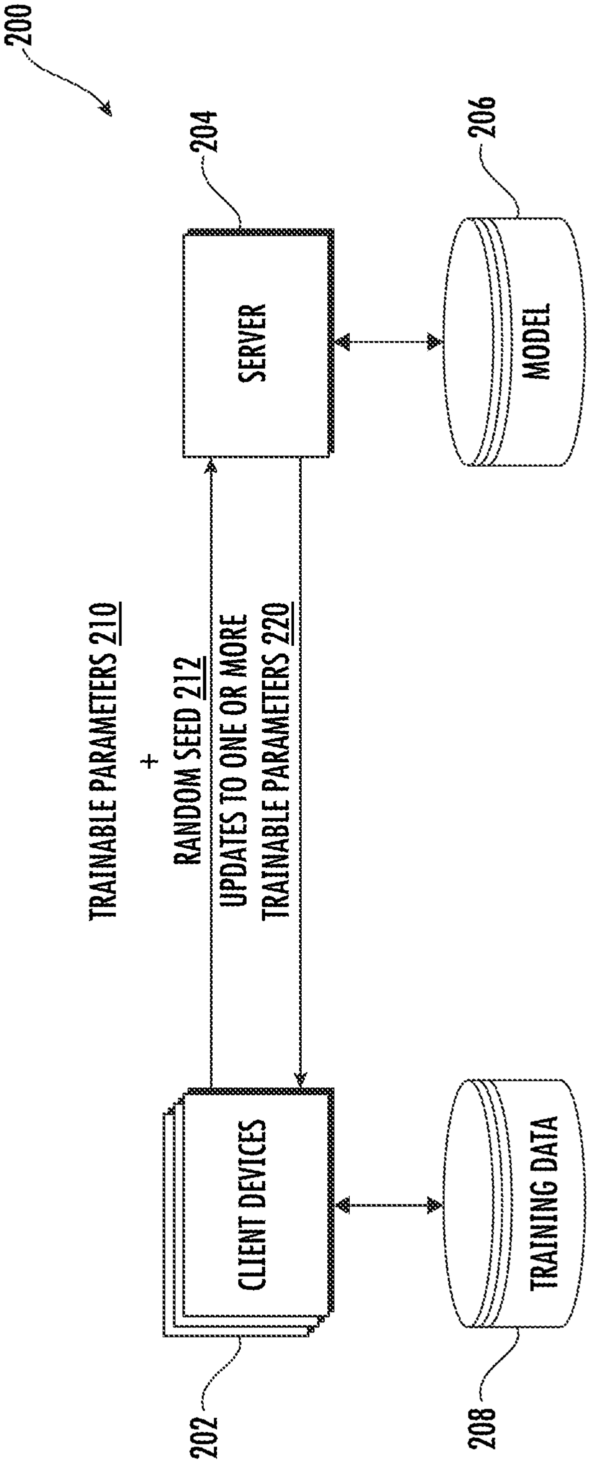
FIG. 2 depicts a block diagram of a system for training one or more global machine learning models using respective training data stored locally on a plurality of client devices according to example embodiments of the present disclosure.

FIG. 2 depicts an example system 200 for training one or more global machine learning models 206 using respective training data 208 stored locally on a plurality of client devices 202. The one or more global machine learning models 206 can include the global model 145 in FIG. 1A. The plurality of client devices 202 can include client computing device 102A and client computing device 102N. System 200 can include a server device 204 (e.g., server computing device 130). The server device 204 can be configured to access machine learning model 206, and to provide trainable parameters 210 of model 206 and a random seed 212 associated with non-trainable parameters (e.g., frozen parameters) to a plurality of client devices 202. For example, the random seed can be generated by processing the non-trainable parameters using a random number generator. The random seed can be a number or a vector. Model 206 can be, for instance, a classifier model, a linear regression model, logistic regression model, a support vector machine model, a neural network (e.g., convolutional neural network, recurrent neural network, etc.), or other suitable model. In some implementations, server 204 can be configured to communicate with client devices 202 over one or more networks.

Client devices 202 can each be configured to determine updates 220 to one or more trainable parameters associated with model 206 based at least in part on training data 208, the trainable parameters 210, and the random seed 212. For instance, training data 208 can be data that is respectively stored locally on the client devices 202. The training data 208 can include audio files, image files, video files, a typing history, location history, and/or various other suitable data. In some implementations, the training data can be any data derived through a user interaction with a client device 202. The client devices 202 can receive the trainable parameters 210 and the random seed 212 from server 204. The client devices 202 can have the same random number generator as the server 204. The client devices 202 can reconstruct the non-trainable parameters by processing the random seed 212 using the random number generator, which can be the same random number generator utilized by the server 204. Once the updates 220 to one or more trainable parameters is determined, the client devices 202 can transmit the updates 220 to one or more trainable parameters to the server 204.

In some instances, the random number generator can include a process for generating a sequence of numbers or symbols that cannot be reasonably predicted better than by random chance. For example, the random number generator can be a hardware random-number generator that generates random numbers, wherein each generation is a function of the current value of a physical environment's attribute that is constantly changing. Alternatively, the random number generator can be a pseudorandom number generator that generates numbers that only look random but are in fact predetermined. These generations can be reproduced simply by knowing the state of the pseudorandom number generator.

Once the server 204 has received the updates 220 to one or more trainable parameters from the client devices, the server 204 can aggregate (e.g., federated averaging) the updates. Subsequently, the server can modify one or more parameters of the model 206 based on the aggregation. The server 204 can aggregate the updates by using a federated averaging technique.

Further to the descriptions above, a user may be provided with controls allowing the user to make an election as to both if and when systems, programs or features described herein may enable collection, storage, and/or use of user information (e.g., training data 208), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although training data 208 is illustrated in FIG. 2 as a single database, the training data 208 consists of data that is respectively stored at each device 202. Thus, in some implementations, the training data 208 is highly unbalanced and not independent and identically distributed.

Client devices 202 can be configured to provide the local updates (e.g., updates 220) to server 204. As indicated above, training data 208 may be privacy sensitive. In this manner, the local updates can be performed and provided to server 204 without compromising the privacy of training data 208. For instance, in such implementations, training data 208 is not provided to server 204. The local updates do not include training data 208. In some implementations in which a locally updated model is provided to server 204, some privacy sensitive data may be able to be derived or inferred from the model parameters. In such implementations, one or more encryption techniques, random noise techniques, and/or other security techniques can be added to the training process to obscure any inferable information.

As indicated above, server 204 can receive each local update (e.g., updates 220) from client device 202, and can aggregate the local updates to determine a global update to the model 206. In some implementations, server 204 can determine an average (e.g., a weighted average) of the local updates and determine the global update based at least in part on the average.

In some implementations, updated parameters are provided to the server 204 by a plurality of client devices 202, and the respective updated parameters are summed across the plurality of client devices 202. The sum for each of the updated parameters may then be divided by a corresponding sum of weights for each parameter as provided by the clients to form a set of weighted average updated parameters. In some implementations, updated parameters are provided to the server 204 by a plurality of client devices 202, and the respective updated parameters scaled by their respective weights are summed across the plurality of clients to provide a set of weighted average updated parameters. In some examples, the weights may be correlated to a number of local training iterations or epochs so that more extensively trained updates contribute in a greater amount to the updated parameter version. In some examples, the weights may include a bitmask encoding observed entities in each training round (e.g., a bitmask may correspond to the indices of embeddings and/or negative samples provided to a client).

In some implementations, satisfactory convergence of the machine-learned models can be obtained without updating every parameter with each training iteration. In some examples, each training iteration includes computing updates for a target set of trainable parameters.

In some implementations, scaling or other techniques can be applied to the local updates to determine the global update. For instance, a local step size can be applied for each client device 202, the aggregation can be performed proportionally to various data partition sizes of client devices 202, and/or one or more scaling factors can be applied to the local and/or aggregated updates. It will be appreciated that various other techniques can be applied without deviating from the scope of the present disclosure.

The updates 220 may include information indicative of the updated trainable parameters. The updates 220 may include the locally updated trainable parameters (e.g., the updated parameters or a difference between the updated parameter and the previous parameter received from the server 204). In some examples, the updates 220 may include an update term, a corresponding weight, and/or a corresponding learning rate, and the server may determine therewith an updated version of the corresponding trainable parameter. Communications between the server 204 and the client devices 204 can be encrypted or otherwise rendered private.

In general, the client devices may compute local updates to trainable parameters periodically or continually. The server may also compute global updates based on the provided client updates periodically or continually. In some implementations, the learning of trainable parameters includes an online or continuous machine-learning algorithm. For instance, some implementations may continuously update trainable parameters within the global model without cycling through training the entire global model.

Example Methods

Figure 3:
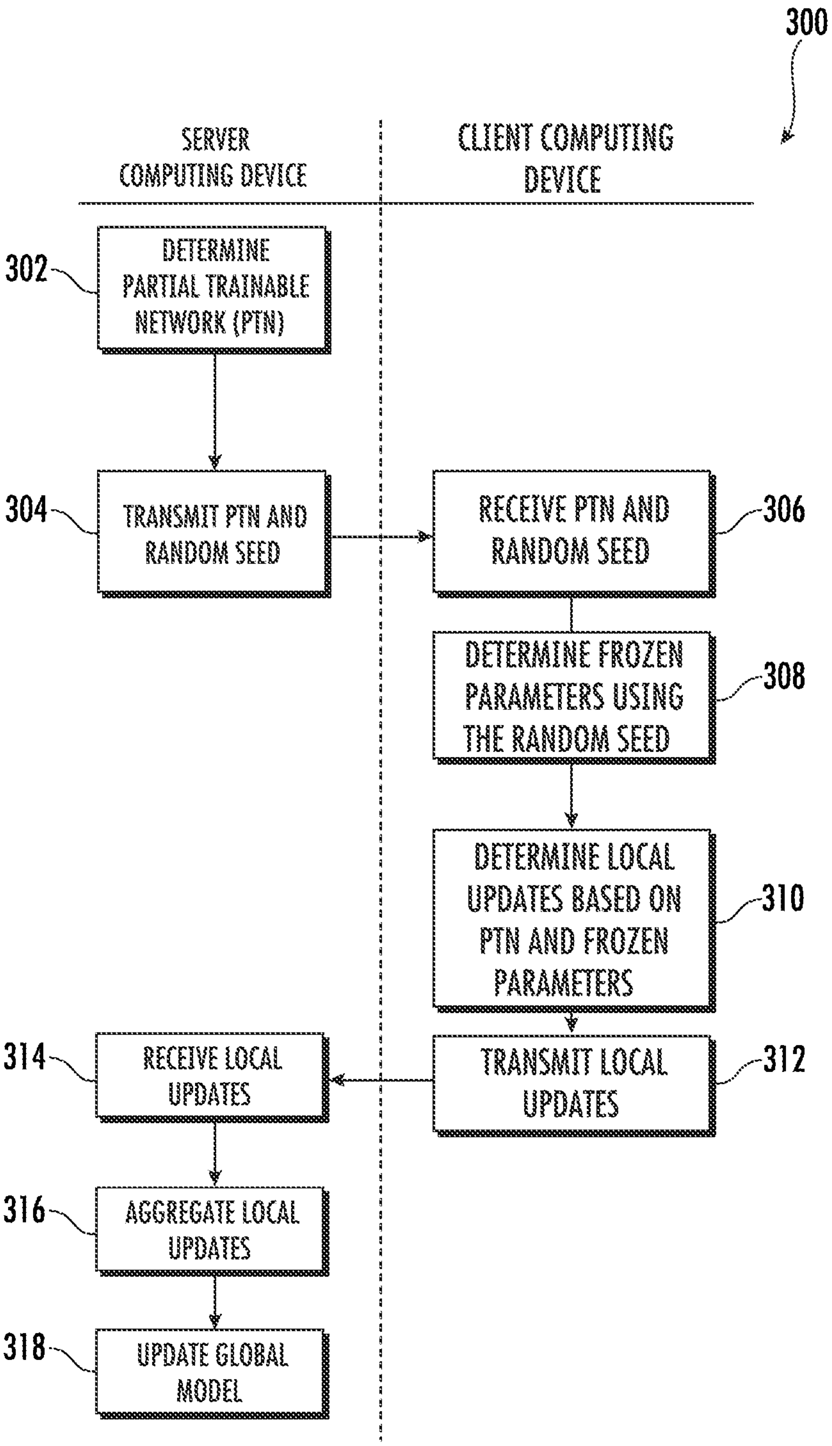
FIG. 3 depicts a flow diagram of an example method of updating a global model with PTNs according to example embodiments of the present disclosure.

FIG. 3 depicts a flow diagram of an example method 300 of training a global model by using federated learning with PTNs according to example embodiments of the present disclosure. Method 300 can be implemented by one or more computing devices, such as one or more of the computing devices depicted in FIGS. 1A-C and/or 2. In addition, FIG. 3 depicts steps performed in a particular order for purposes of illustration and discussion. Each respective portion of the method 300 can be performed by any (or any combination) of one or more computing devices. Those of ordinary skill in the art, using the disclosures provided herein, will understand that the steps of any of the methods discussed herein can be adapted, rearranged, expanded, omitted, or modified in various ways without deviating from the scope of the present disclosure.

FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 3 is described with reference to elements/terms described with respect to other systems and figures for exemplary illustrated purposes and is not meant to be limiting. One or more portions of method 300 can be performed additionally, or alternatively, by other systems.

The classification model can be collaboratively learned with the help of a server which facilitates the iterative training process by keeping track of a global model. During each round of the training process, the server sends the current global model to a set of participating users; each user updates the model with its local data and sends the model delta to the server; and the server averages the deltas collected from the participating users and updates the global model.

At 302, method 300 can include the server computing device determining a partially trainable network (PTN). In some instances, the PTN can be parameters of the global model that are being trained. For example, the server computing device can determine to freeze the largest parameter block, and the remaining parameters can be part of the PTN to be trained.

At 304, method 300 can include the server computing device transmitting the PTN and a random seed to a plurality of client computing devices. The random seed can be a randomly generated number that is associated with the frozen parameters.

At 306, method 300 can include the client computing device receiving the PTN and the random seed from the server computing device.

At 308, method 300 can include the client computing device determining the frozen parameters from the random seed by using a random number generator. For example, the random number generator used by the client computing device can be the same as the random number generator in the server computing device that generated the random seed.

At 310, method 300 can include the client computing device determining local updates based on the PTN and the frozen parameters.

A 312, method 300 can include the client computing device transmitting the local updates to the server computing device.

At 314, method 300 can include the server computing device receiving the local updates from a plurality of client devices.

At 316, method 300 can include the server computing device aggregating the local updates from the plurality of client devices.

At 318, method 300 can include the server computing device updating the global model based on the aggregation.

Any number of iterations of local and global updates can be performed. That is, method (300) can be performed iteratively to update the global model based on locally stored training data over time.

Figure 4:
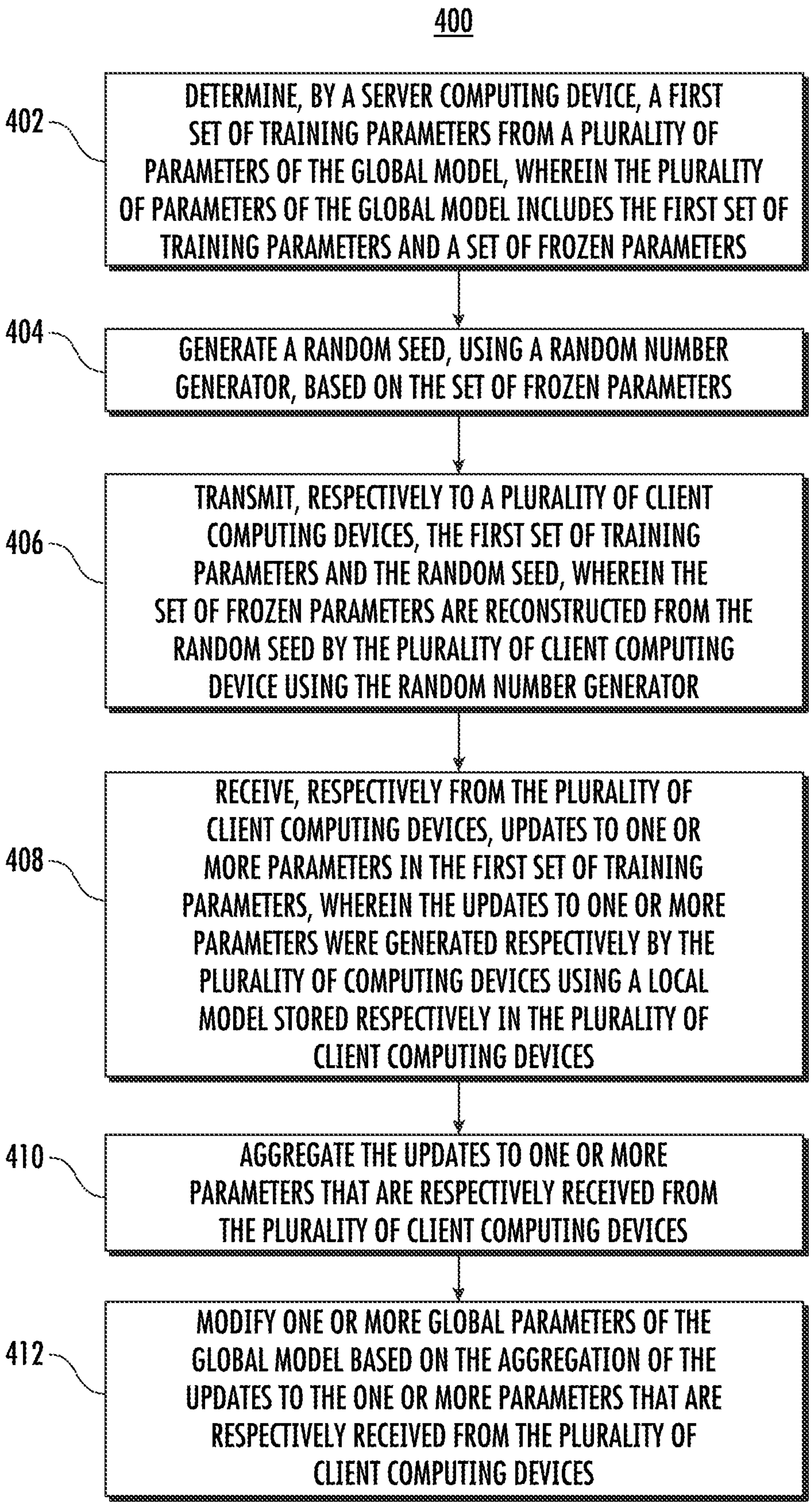
FIG. 4 depicts a flow chart diagram of an example method to perform federated learning with PTNs using a server computing device according to example embodiments of the present disclosure.

FIG. 4 depicts a flowchart of a method 400 to perform federated learning with PTNs according to example embodiments of the present disclosure. One or more portion(s) of the method 400 can be implemented by a computing system that includes one or more computing devices such as, for example, the computing systems described with reference to the other figures (e.g., server computing system 130, computing device 10, computing device 50, server 204). Each respective portion of the method 400 can be performed by any (or any combination) of one or more computing devices. Moreover, one or more portion(s) of the method 400 can be implemented as an algorithm on the hardware components of the device(s) described herein (e.g., FIGS. 1A-C, 2), for example, to train a machine-learning model (e.g., machine-learned model(s) 140).

FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 4 is described with reference to elements/terms described with respect to other systems and figures for exemplary illustrated purposes and is not meant to be limiting. One or more portions of method 400 can be performed additionally, or alternatively, by other systems.

At operation 402, the method can include determining, by a server computing device, a first set of training parameters from a plurality of parameters of the global model. The plurality of parameters of the global model can include the first set of training parameters and a set of frozen parameters.

In some instances, the first set of parameters and the set of frozen parameters are determined based on a specific network architecture associated with the global model.

In some instances, the set of frozen parameters are associated with a convolutional layer, an encoder layer, or a dense layer of the global model.

In some instances, the first set of parameters are associated with a normalization layer of the global model.

In some instances, the set of frozen parameters are respectively set to initial values, wherein the initial values are generated from Gaussian initializers.

In some instances, the set of frozen parameters can be different during each training iteration in a plurality of training iterations for the global model. For example, the method can change the set of variables that are frozen at each training iteration (e.g., round).

At operation 404, the method can include generating a random seed, using a random number generator, based on the set of frozen parameters. In some instances, the server computing system can generate the random seed for the frozen parameters by using a random number generator. Subsequently, the client computing device can determine the frozen parameters from the random seed by using the same random number generator.

In some instances, the method can include generating an initialization value based on the frozen parameters. For example, the initialization value can be random seed that is generated by the server computing system using a random number generator based on the set of frozen parameters. Additionally, the set of frozen parameters are reconstructed from the initialization value (e.g., random seed) by the plurality of client computing devices using the random number generator.

At operation 406, the method can include transmitting, respectively to a plurality of client computing devices, the first set of training parameters and the random seed. The set of frozen parameters can be reconstructed from the random seed by the plurality of client computing devices using the random number generator.

At operation 408, the method can include receiving, respectively from the plurality of client computing devices, updates to one or more parameters in the first set of training parameters. The updates to one or more parameters can be generated respectively by the plurality of computing devices using a local model stored respectively in the plurality of client computing devices.

In some instances, the updates to one or more parameters in the first set of training parameters are calculated by processing the local model with the first set of parameters and the set of frozen parameters.

In some instances, the local model is based on data stored locally on the plurality of client computing devices.

At operation 410, the method can include aggregating the updates to one or more parameters that are respectively received from the plurality of client computing devices.

In some instances, the aggregating the updates to one or more parameters that are respectively received from the plurality of client computing devices is performed by the server computing device by using a federated averaging technique.

At operation 412, the method can include modifying one or more global parameters of the global model based on the aggregation of the updates to the one or more parameters that are respectively received from the plurality of client computing devices.

In some instances, the first set of training parameters and the random seed can be transmitted to a first client computing device in the plurality of client computing device, and wherein a second set of training parameters is sent to a second client computing device based on a low resource capacity of the second client computing device, wherein first set of training parameters has more training parameters than the second set of training parameters. For example, the system can adapt the number of trainable parameters (e.g., variables) and/or the number of frozen variables depending on the edge device capacity. For example, the server computing device can send a first number of trainable parameters to a low resource device and a second number of trainable parameters to a high resource device. The first number being less than the second number. As a result, the low resource device would train very fewer parameters, and a higher resource device would train more parameters at a given iteration (e.g., round).

Figure 5:
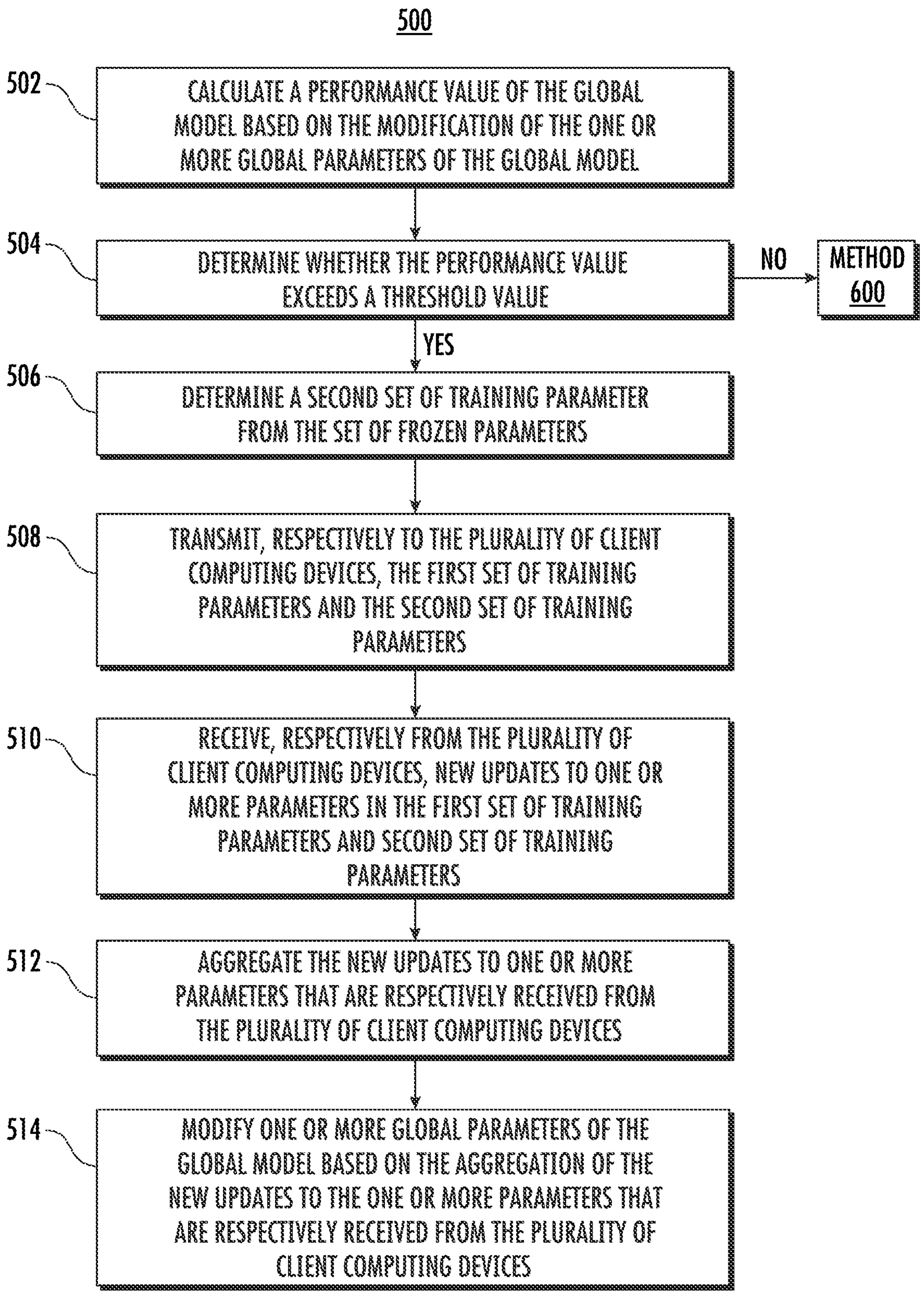
FIG. 5 depicts a flow chart diagram of an example method to perform federated learning with PTNs according to example embodiments of the present disclosure.

FIG. 5 depicts a flow chart diagram of an example method 500 to perform federated learning with PTNs according to example embodiments of the present disclosure. Method 500 increases the number of trainable parameters in order to improve the accuracy of the model. One or more portion(s) of the method 500 can be implemented by a computing system that includes one or more computing devices such as, for example, the computing systems described with reference to the other figures (e.g., server computing system 130, computing device 10, computing device 50, server 204). Each respective portion of the method 500 can be performed by any (or any combination) of one or more computing devices. Moreover, one or more portion(s) of the method 500 can be implemented as an algorithm on the hardware components of the device(s) described herein (e.g., FIGS. 1A-C, 2), for example, to train a machine-learning model (e.g., machine-learned model(s) 140).

FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 5 is described with reference to elements/terms described with respect to other systems and figures for exemplary illustrated purposes and is not meant to be limiting. One or more portions of method 500 can be performed additionally, or alternatively, by other systems.

At operation 502, the method can include calculating a performance value of the global model based on the modification of the one or more global parameters of the global model.

In some instances, the performance value is associated with a confusion matrix that is related to a number of true positives, true negatives, false positives, or false negatives.

In some instances, the performance value is associated with a precision ratio that is related to a number of true positives and a total number of positive predictions.

At operation 504, the method can include determining whether the performance value exceeds a threshold value. In some instances, the performance value exceeds the threshold value when an accuracy percentage of the global model is reduced by a specific margin after the modification of the one or more global parameters of the global model, which may result in performance degradation.

When the performance value does exceed the threshold value, the operation 504 continues to operation 506 to train more parameters in order to improve the accuracy of the model. When the performance value does exceed the threshold value, then less parameters of the global model may be frozen in the next iteration in order to improve the performance value (e.g., improve accuracy percentage of the global model).

Figure 6:
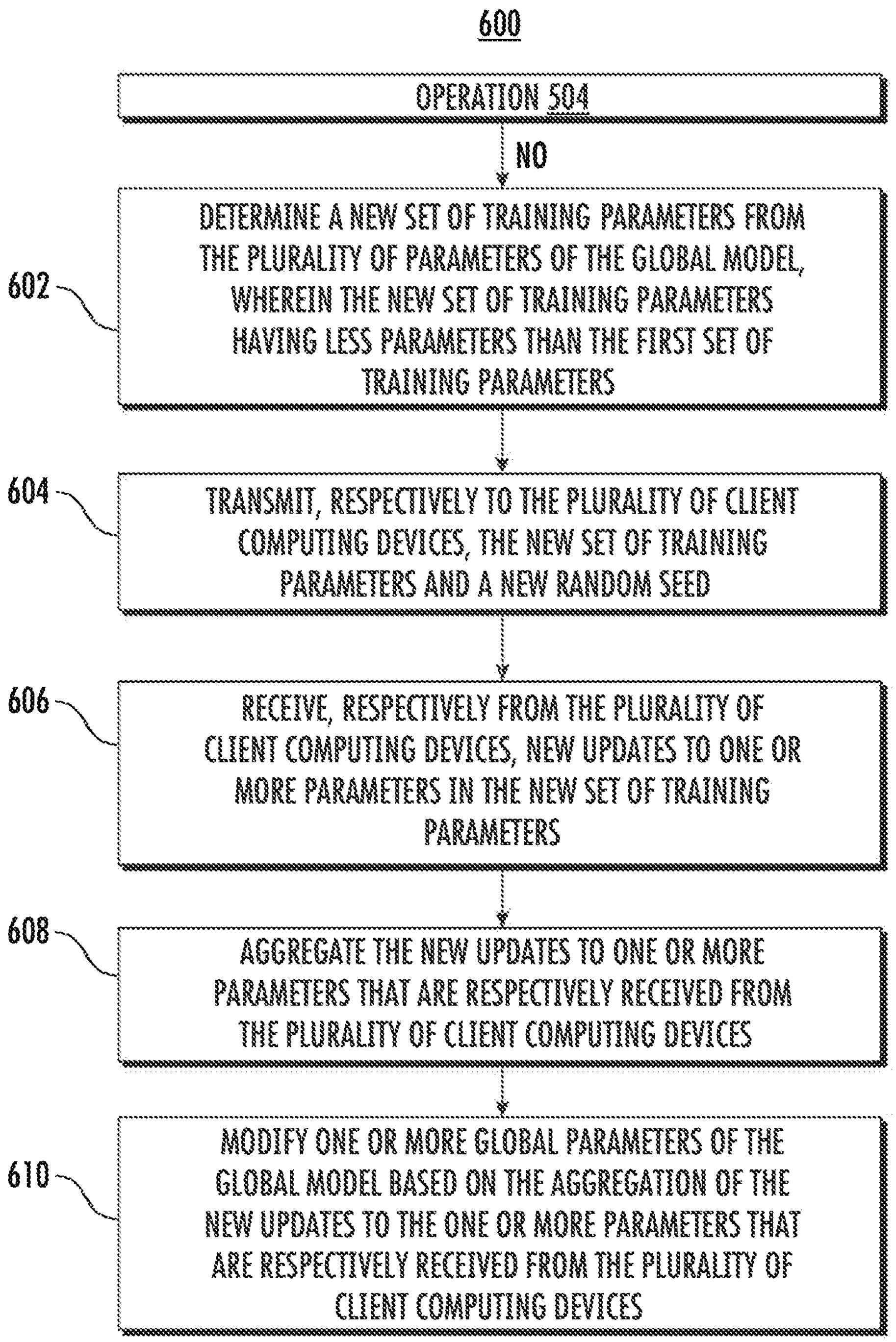
FIG. 6 depicts a flow chart diagram of an example method to perform federated learning with PTNs according to example embodiments of the present disclosure.

Alternatively, when the performance value does not exceed the threshold value, operation 504 continues to method 600 described in FIG. 6. Method 600 allows for more parameters to be frozen in the next iteration.

At operation 506, when the performance value does not exceed the threshold value, the method can include determining a second set of training parameters from the set of frozen parameters at operation 506. In some instances, the method can include determining a second set of training parameters from the first set of training parameters at operation 506. In some instances, the second set of training parameters can have less parameters than the first set of training parameters.

At operation 508, the method can include transmitting, respectively to the plurality of client computing devices, the first set of training parameters and the second set of training parameters. In some instances, the method can include transmitting, respectively to the plurality of client computing devices, only the second set of training parameters and not the first set of training parameters.

At operation 510, the method can include receiving, respectively from the plurality of client computing devices, new updates to one or more parameters in the first set of training parameters and second set of training parameters. In some instances, the method can include receiving, respectively from the plurality of client computing devices, new updates to one or more parameters in the just the second set of training parameters.

At operation 512, the method can include aggregating the new updates to one or more parameters that are respectively received from the plurality of client computing devices.

At operation 514, the method can include modifying one or more global parameters of the global model based on the aggregation of the new updates to the one or more parameters that are respectively received from the plurality of client computing devices.

FIG. 6 depicts a flow chart diagram of an example method 600 to perform federated learning with partially trained networks according to example embodiments of the present disclosure. Method 600 increases the number of frozen parameters, which result in less parameters being trained. One or more portion(s) of the method 600 can be implemented by a computing system that includes one or more computing devices such as, for example, the computing systems described with reference to the other figures (e.g., server computing system 130, computing device 10, computing device 50, server 204). Each respective portion of the method 600 can be performed by any (or any combination) of one or more computing devices. Moreover, one or more portion(s) of the method 600 can be implemented as an algorithm on the hardware components of the device(s) described herein (e.g., FIGS. 1A-C, 2), for example, to train a machine-learning model (e.g., machine-learned model(s) 140).

FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

As previously mentioned, when the performance value determined at 504 does not exceed the threshold value, the operation 504 continues to method 600 described in FIG. 6. When the performance value does not exceed the threshold value, then more parameters of the global model may be frozen in the next iteration in order to train less parameters of the global model.

At operation 602, the method can include determining a new set of training parameters from the plurality of parameters of the global model. The new set of training parameters can have less parameters than the first set of training parameters. In some instances, method 600 can include determining additional parameters from the first set of parameters to freeze. For example, an updated set of frozen parameters can include the additional parameters from the first set of parameters that have been determined to be frozen.

At operation 604, the method can include transmitting, respectively to the plurality of client computing devices, the new set of training parameters and a new random seed. The new random seed can be generated from the updated set of frozen parameters by the random seed generator.

At operation 606, the method can include receiving, respectively from the plurality of client computing devices, new updates to one or more parameters in the new set of training parameters.

At operation 608, the method can include aggregating the new updates to one or more parameters that are respectively received from the plurality of client computing devices.

At operation 610, the method can include modifying one or more global parameters of the global model based on the aggregation of the new updates to the one or more parameters that are respectively received from the plurality of client computing devices.

Figure 7:
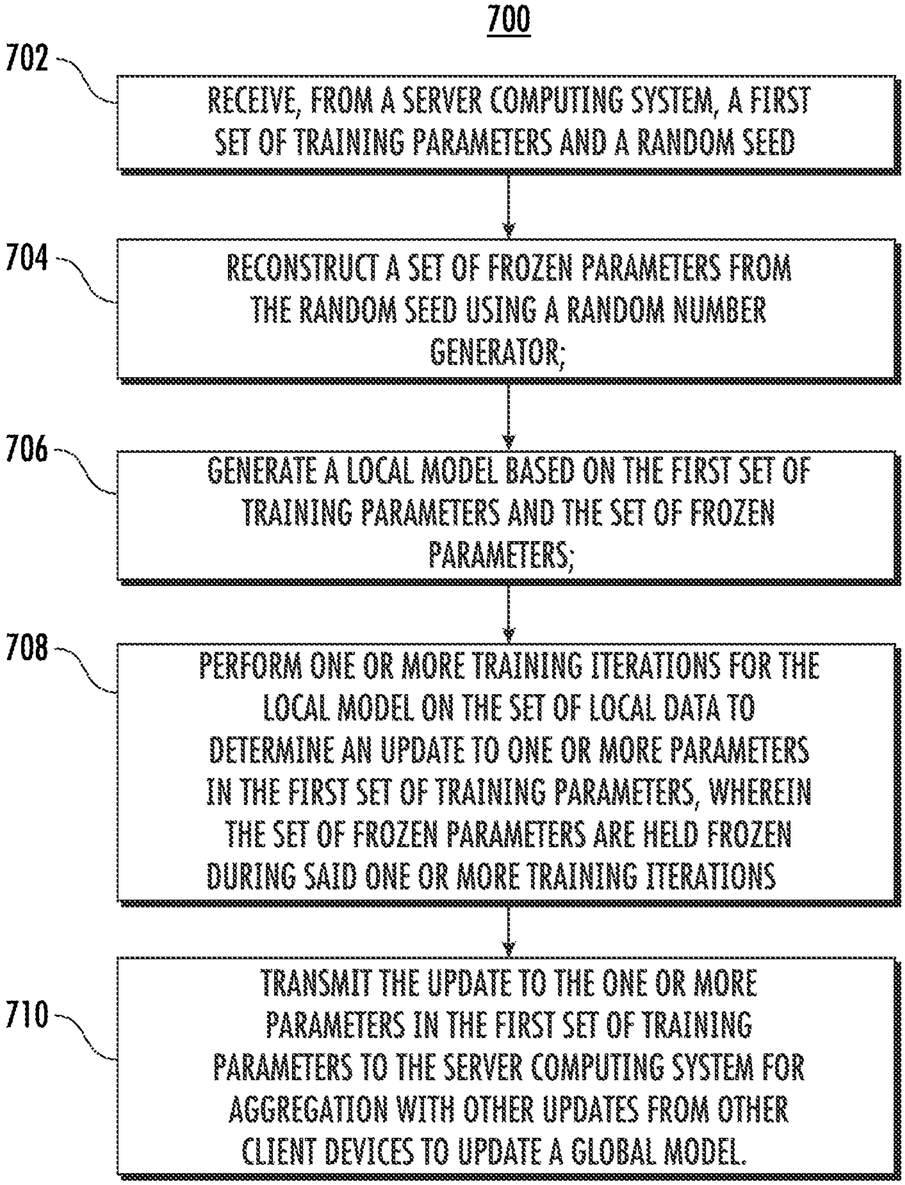
FIG. 7 depicts a flow chart diagram of an example method to perform federated learning with PTNs using a client device according to example embodiments of the present disclosure.

FIG. 7 depicts a flow chart diagram of an example method 700 to perform federated learning with partially trained networks using a client device according to example embodiments of the present disclosure. One or more portion(s) of the method 500 can be implemented by a computing system that includes one or more computing devices such as, for example, the computing systems described with reference to the other figures (e.g., client computing system 102A-N, computing device 10, computing device 50, client devices 202). Each respective portion of the method 700 can be performed by any (or any combination) of one or more computing devices. Moreover, one or more portion(s) of the method 500 can be implemented as an algorithm on the hardware components of the device(s) described herein (e.g., FIGS. 1A-C, 2), for example, to train a machine-learning model (e.g., machine-learned model(s) 140).

FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 500 can be performed additionally, or alternatively, by other systems.

The client device can include one or more processors, and one or more non-transitory computer-readable media that collectively store a set of local data and instructions. The instructions, when executed, can cause the one or more processors to perform the operations described in method 700.

At operation 702, the method can include receiving, from a server computing system, a first set of training parameters and a random seed. For example, the first set of training parameters and the random seed can be similar to the first set of training parameters and random seed that is transmitted by the server computing device at 406.

At operation 704, the method can include reconstructing a set of frozen parameters from the random seed using a random number generator. For example, by using the same random number generator that the server computing device utilized at 404 in FIG. 4 to create the random seed, the client device can reconstruct the set of frozen parameters from the random seed.

At operation 706, the method can include generating a local model based on the first set of training parameters and the set of frozen parameters. In some instances, the client device can generate a local model by using local data, the received first set of training parameters, and the reconstructed set of frozen parameters.

At operation 708, the method can include performing one or more training iterations for the local model on the set of local data to determine an update to one or more parameters in the first set of training parameters. The set of frozen parameters can be held frozen during said one or more training iterations.

At operation 710, the method can include transmitting the update to the one or more parameters in the first set of training parameters to the server computing system for aggregation with other updates from other client devices to update a global model. For example, the update to the one or more parameters in the first set of training parameters can be received by the server computing system at 408 in FIG. 4.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for federated learning of a global model with improved communication efficiency, the method comprising:

determining, by a server computing system, a first set of training parameters from a plurality of parameters of the global model, wherein the plurality of parameters of the global model includes the first set of training parameters and a set of frozen parameters;

transmitting, by the server computing system, respectively to a plurality of client computing devices, the first set of training parameters and an initialization value, wherein the set of frozen parameters are reconstructed from the initialization value by the plurality of client computing devices;

receiving, by the server computing system, respectively from the plurality of client computing devices, updates to one or more parameters in the first set of training parameters, wherein the updates to one or more parameters were generated respectively by the plurality of computing devices using a local model stored respectively in the plurality of client computing devices;

aggregating by the server computing system, the updates to one or more parameters that are respectively received from the plurality of client computing devices; and modifying by the server computing system, one or more global parameters of the global model based on the aggregation of the updates to the one or more parameters that are respectively received from the plurality of client computing devices.

2. The method of claim 1, further comprising:

calculating a performance value of the global model based on the modification of the one or more global parameters of the global model; and determining whether the performance value exceeds a threshold value.

3. The method of claim 2, wherein the performance value does not exceed the threshold value, the method further comprising:

determining a second set of training parameters from the set of frozen parameters;

transmitting, respectively to the plurality of client computing devices, the first set of training parameters and the second set of training parameters;

receiving, respectively from the plurality of client computing devices, new updates to one or more parameters in the first set of training parameters and second set of training parameters;

aggregating the new updates to one or more parameters that are respectively received from the plurality of client computing devices; and modifying one or more global parameters of the global model based on the aggregation of the new updates to the one or more parameters that are respectively received from the plurality of client computing devices.

4. The method of claim 2, wherein the performance value exceeds the threshold value, the method further comprising:

determining a new set of training parameters from the plurality of parameters of the global model, wherein the new set of training parameters having less parameters than the first set of training parameters;

transmitting, respectively to the plurality of client computing devices, the new set of training parameters and a new initialization value;

receiving, respectively from the plurality of client computing devices, new updates to one or more parameters in the new set of training parameters;

aggregating the new updates to one or more parameters that are respectively received from the plurality of client computing devices; and modifying one or more global parameters of the global model based on the aggregation of the new updates to the one or more parameters that are respectively received from the plurality of client computing devices.

5. The method of claim 4, wherein the performance value exceeds the threshold value when an accuracy percentage of the global model is reduced by a specific margin after the modification of the one or more global parameters of the global model.

6. The method of claim 2, wherein the performance value is associated with a confusion matrix that is related to a number of true positives, true negatives, false positives, or false negatives.

7. The method of claim 2, wherein the performance value is associated with a precision ratio that is related to a number of true positives and a total positive predictions.

8. The method of claim 1, wherein the updates to one or more parameters in the first set of training parameters are calculated by processing the local model with the first set of parameters and the set of frozen parameters.

9. The method of claim 1, wherein the updates to one or more parameters in the first set of training parameters are respectively based on data stored locally on the plurality of client computing devices.

10. The method of claim 1, wherein the first set of parameters and the set of frozen parameters are determined based on a specific network architecture associated with the global model.

11. The method of claim 1, wherein the set of frozen parameters are associated with a convolutional layer, an encoder layer, or a dense layer of the global model.

12. The method of claim 1, wherein the first set of parameters are associated with a normalization layer of the global model.

13. The method of claim 1, wherein the set of frozen parameters are respectively set to initial values, wherein the initial values are generated from Gaussian initializers.

14. The method of claim 1, wherein the aggregating the updates to one or more parameters that are respectively received from the plurality of client computing devices is performed by the server computing device by using a federated averaging technique.

15. The method of claim 1, wherein the set of frozen parameters are different during each training iteration in a plurality of training iterations for the global model.

16. The method of claim 1, wherein the first set of training parameters transmitted to a first client computing device in the plurality of client computing device, wherein a second set of training parameters is sent to a second client computing device based on a low resource capacity of the second client computing device, and wherein first set of training parameters has more training parameters than the second set of training parameters.

17. The method of claim 1, wherein the initialization value is a random seed that is generated by the server computing system using a random number generator based on the set of frozen parameters, and wherein the set of frozen parameters are reconstructed from the random seed by the plurality of client computing devices using the random number generator.

18. A server computing system, comprising:

one or more processors; and one or more non-transitory computer-readable media that collectively store:

a machine learning model having a plurality of global parameters; and instructions that, when executed by the one or more processors, cause the server computing device to perform operations, the server operations comprising:

determining, by a server computing device, a first set of training parameters from a plurality of parameters of the global model, wherein the plurality of parameters of the global model includes the first set of training parameters and a set of frozen parameters;

transmitting, respectively to a plurality of client computing devices, the first set of training parameters and an initialization value, wherein the set of frozen parameters are reconstructed from the initialization value by the plurality of client computing devices;

receiving, respectively from the plurality of client computing devices, updates to one or more parameters in the first set of training parameters, wherein the updates to one or more parameters were generated respectively by the plurality of computing devices using a local model stored respectively in the plurality of client computing devices;

aggregating the updates to one or more parameters that are respectively received from the plurality of client computing devices; and modifying one or more global parameters of the machine learning model based on the aggregation of the updates to the one or more parameters that are respectively received from the plurality of client computing devices.

19. The server computing system of claim 18, the server operations further comprising:

calculating a performance value of the global model based on the modification of the one or more global parameters of the global model;

determining whether the performance value exceeds a threshold value;

in response to the performance value not exceeding the threshold value, determining a second set of training parameters from the set of frozen parameters;

transmitting, respectively to the plurality of client computing devices, the first set of training parameters and the second set of training parameters;

receiving, respectively from the plurality of client computing devices, new updates to one or more parameters in the first set of training parameters and second set of training parameters;

aggregating the new updates to one or more parameters that are respectively received from the plurality of client computing devices; and modifying one or more global parameters of the global model based on the aggregation of the new updates to the one or more parameters that are respectively received from the plurality of client computing devices.

20. One or more non-transitory computer-readable media that collectively store a machine learning model having been updated by performance of operations, the operations comprising:

determining a first set of training parameters from a plurality of parameters of the global model, wherein the plurality of parameters of the global model includes the first set of training parameters and a set of frozen parameters;

transmitting, respectively to a plurality of client computing devices, the first set of training parameters and an initialization value, wherein the set of frozen parameters are reconstructed from the initialization value by the plurality of client computing devices;

receiving, respectively from the plurality of client computing devices, updates to one or more parameters in the first set of training parameters, wherein the updates to one or more parameters were generated respectively by the plurality of computing devices using a local model stored respectively in the plurality of client computing devices;

aggregating the updates to one or more parameters that are respectively received from the plurality of client computing devices; and modifying one or more global parameters of the machine learning model based on the aggregation of the updates to the one or more parameters that are respectively received from the plurality of client computing devices.

* * * * *